J. Q. SLYE.
NON-SKIDDING DEVICE FOR AUTOMOBILES.
APPLICATION FILED FEB. 13, 1918.
1,287,483.
Patented Dec. 10, 1918.
3 SHEETS—SHEET 1.
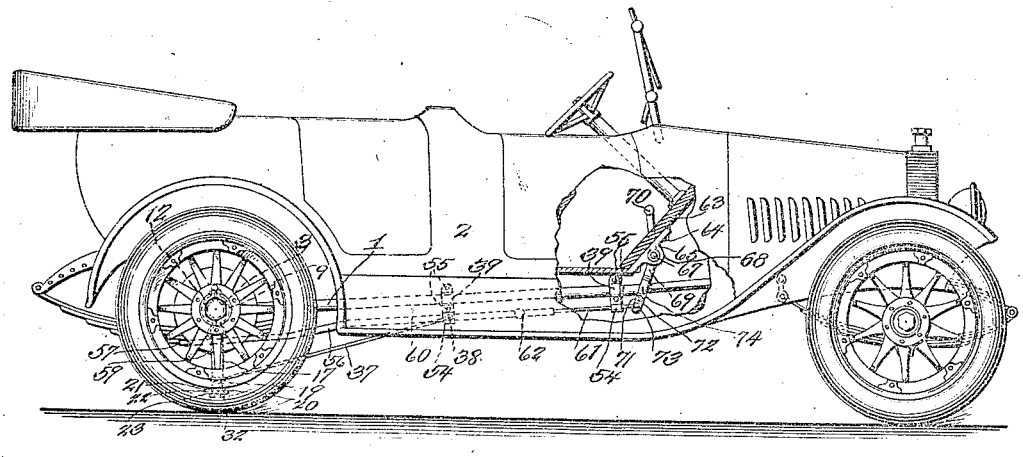
Fig. 1.
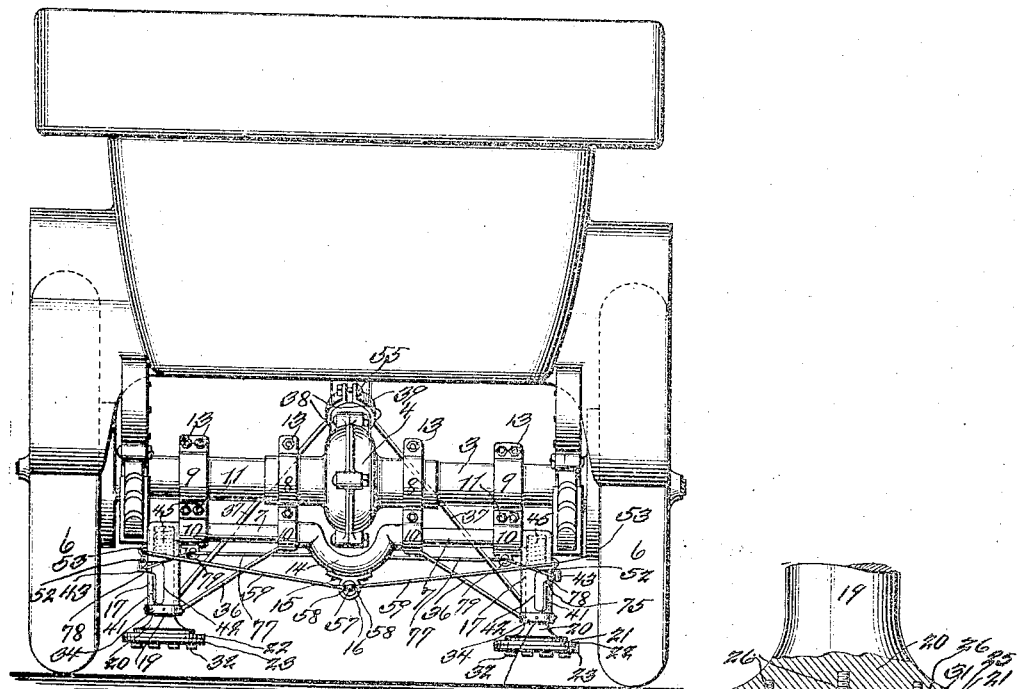
Fig. 10.    Fig. 5.
Inventor
John Queen Slye
By
Attorneys

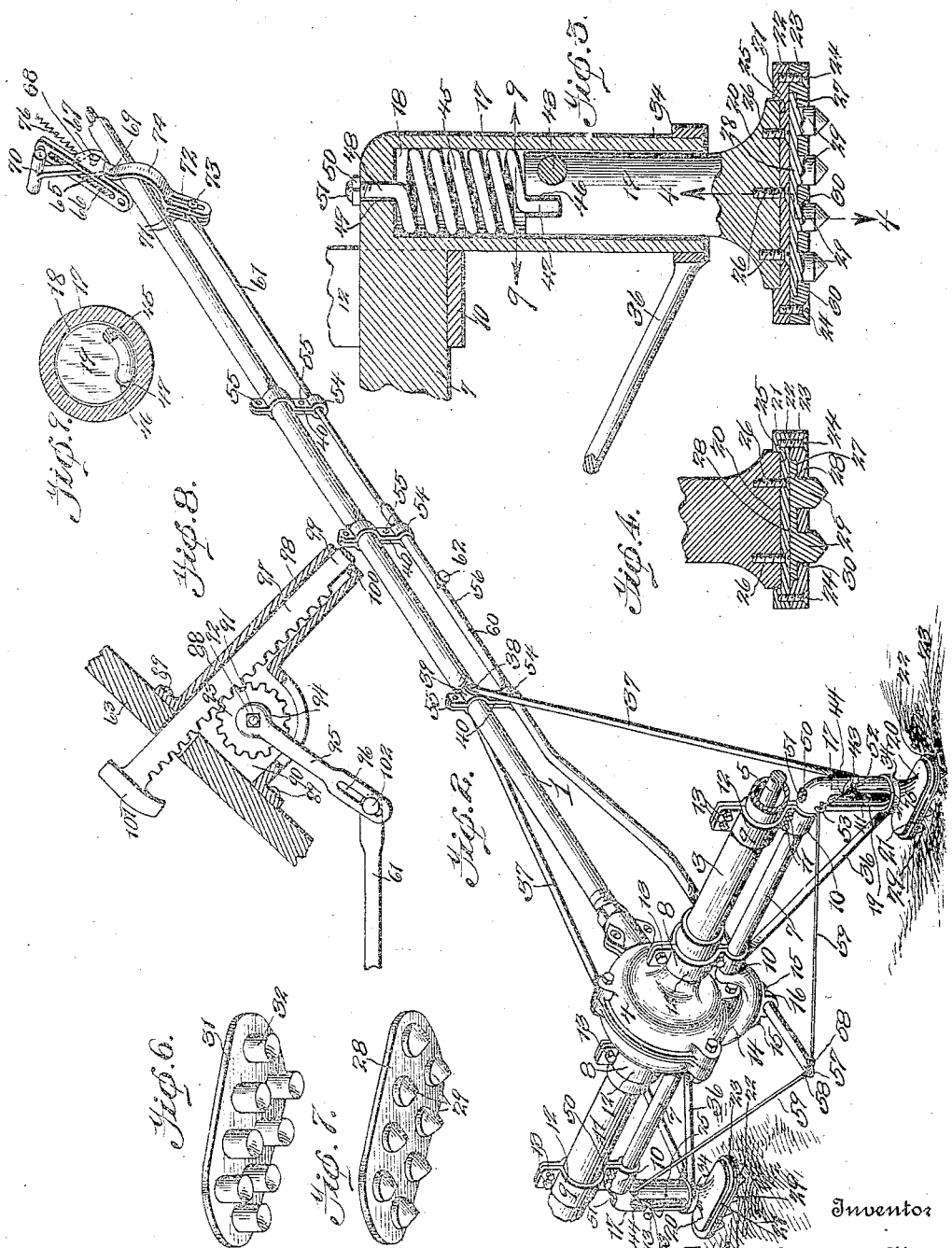

J. Q. SLYE.
NON-SKIDDING DEVICE FOR AUTOMOBILES.
APPLICATION FILED FEB. 13, 1918.
1,287,483.
Patented Dec. 10, 1918.
3 SHEETS—SHEET 3.
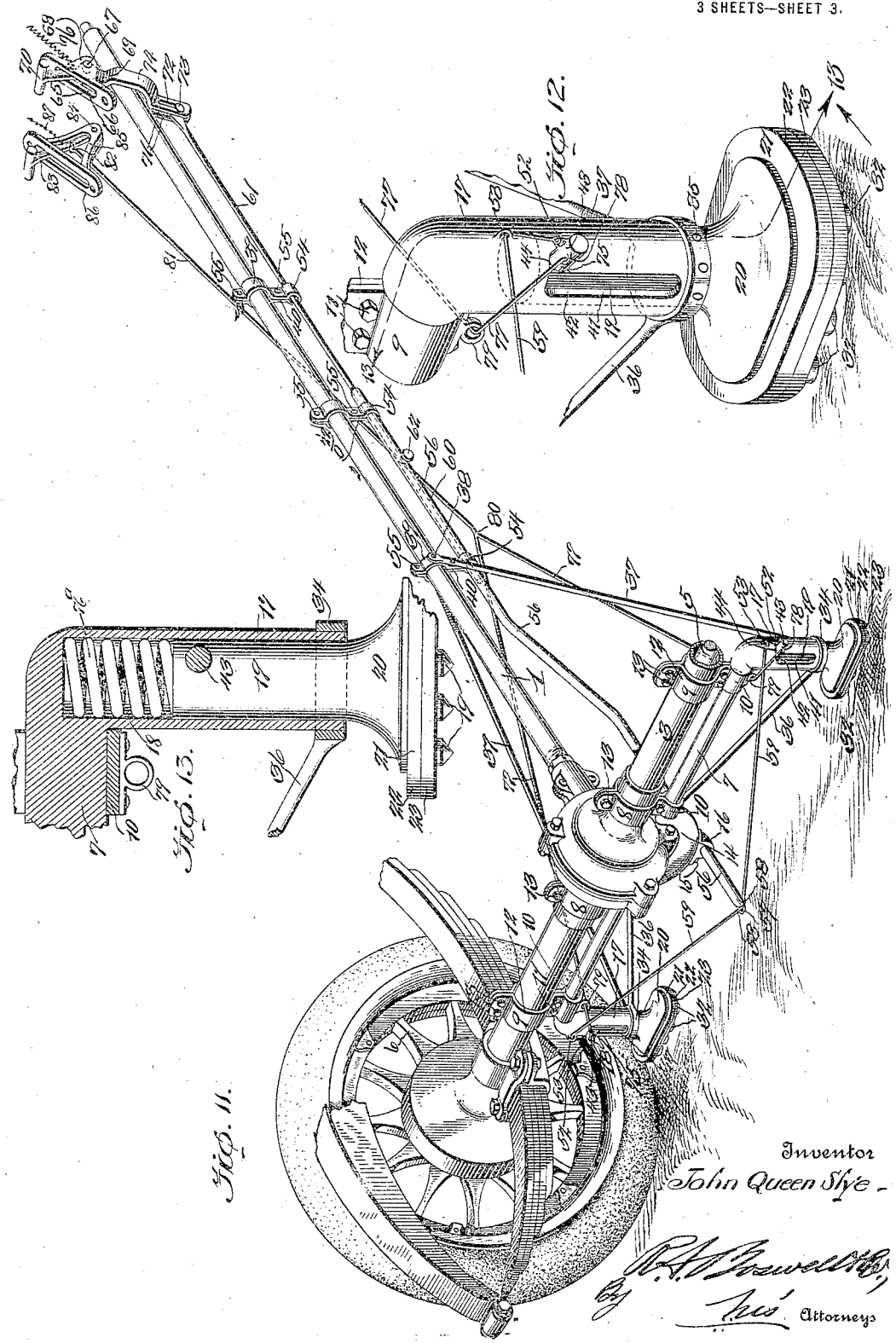

UNITED STATES PATENT OFFICE.

JOHN QUEEN SLYE, OF WASHINGTON, DISTRICT OF COLUMBIA.

NON-SKIDDING DEVICE FOR AUTOMOBILES.

1,287,483.   Specification of Letters Patent.   Patented Dec. 10, 1918.

Application filed February 13, 1918.  Serial No. 216,841.

*To all whom it may concern:*

Be it known that I, JOHN QUEEN SLYE, a citizen of the United States of America, residing at Washington city, in the District of Columbia, have invented a new and useful Non-Skidding Device for Automobiles, of which the following is a specification.

In driving automobiles during sleety, snowy, and wet weather, forward, backward, and lateral skidding is very often experienced, more especially at the time of sudden stopping and starting, either on making curves or going straight ahead, and at sudden stopping resulting from applying the emergency brake. The automobile wheels and their tires, the frame or the chassis, the springs, and the body are not only subjected to strains and other damaging effects, but there have occurred many accidents against life as a result of skidding.

It has been particularly noted that at the time of starting an automobile during heavy snows, even though the drive wheels be equipped with the conventional "Weed" chains, the wheels spin around, with hardly any effect on the automobile, and, hence, it is the aim of this invention to provide a device to overcome such difficulty.

Consequently, this invention relates to an improved anti- or non-skidding device of the kind to be manually manipulated or controlled by the operator or chauffeur, at any time, particularly during the emergencies heretofore mentioned.

The invention aims to provide against forward, backward and lateral skidding, hence, relieving the strains and wear and other damages on the various foregoing parts of the automobile, and, at the same time, avoiding accidents.

A further object of the present invention results in providing an improved anti- or non-skidding device, which is quick and exceedingly positive in action.

A further object resides in the provision of means manually manipulated, and, subsequently, becoming automatic, for instantly releasing non-skidding members, in order to permit them to quickly respond to their positive actions.

A further object of the invention is to provide a pair of spring-tensioned plungers having non-skidding means, and holding means for said plungers, and a mechanism to so actuate said plungers as to be released from the holding means, whereby the plungers, under the actions of their tensioning springs, will move or be forced downwardly and apply their non-skidding means.

A further object of the invention is the provision of non-skidding means consisting of vacuum cups and spikes or the like, which are interchangeable, the vacuum cups for sleety, slippery, rainy or wet weather, whereas the spikes are especially designed for hard packed snow or icy road-beds.

A further object of the invention is to provide operating means for the non-skidding members, adjustable to fit automobile frames or chassis of different lengths.

A further object of the invention consists in the provision of a single means for releasing the plungers from and re-setting them into engagement with their holding means.

A further object of the invention is to provide suspension means for the non-skidding devices, and bracing means for reinforcing the entire structure, in order to insure rigidity, whereby the entire structure may resist the various strains, at the time of the application of the non-skidding means.

A further object of the invention is to provide a device of the present kind for overcoming the whirling or spinning of the drive wheels at the time of starting the automobile, it being the aim that at the time of starting the plungers with the non-skidding means or shoes on their lower ends are instantly lowered, digging or gripping firmly into the hard snow, thereby holding the machine and giving the "Weed" chains their necessary chances to take hold, whereby the automobile may start forwardly.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in side elevation of an automobile showing the improved non-skidding or anti-skidding apparatus, as applied.

Fig. 2 is a perspective view of the center drive shaft casing, the rear drive axle casing and the differential casing, illustrating the application of the anti- or non-skidding device.

Fig. 3 is a detail vertical sectional view through one of the plunger chambers, showing the spring tensioned plunger mounted therein, with its non-skidding device at its lower end.

Fig. 4 is a sectional view on line 4—4 of Fig. 3.

Fig. 5 is a detail sectional view, showing a foot of one of the plungers, illustrating the non-skidding vacuum cups.

Fig. 6 is a detail perspective view of the rubber or composition of rubber and canvas plate with its vacuum cups formed therewith.

Fig. 7 is a detail perspective view of a spiked plate adapted to be substituted for the vacuum cupped plate.

Fig. 8 is a detail sectional view through a modified form of means for operating or releasing the non-skidding plungers.

Fig. 9 is a transverse sectional view on line 9—9 of Fig. 3.

Fig. 10 is a rear view of a conventional form of automobile, showing an improved non-skidding apparatus as applied, showing a modified means for operating the same.

Fig. 11 is a perspective view of the center drive shaft casing, the rear drive axle casing and its differential casing and one of the drive wheels of an automobile, showing the improved non-skidding apparatus applied.

Fig. 12 is an enlarged detail perspective view of one of the non-skidding devices shown in Fig. 11.

Fig. 13 is a sectional view on line 13—13 of Fig. 12.

Referring more especially to the drawings, particularly Figs. 1, 2, 10 and 11, 1 designates the conventional center drive shaft casing of an automobile 2, and 3 denotes the rear drive axle casing, and 4 the differential casing. Carried by the rear drive axle 5 are the usual drive wheels 6.

By means of an improved hanger, the non-skidding devices are suspended from the casing 3. This hanger comprises a member 7, preferably constructed of rod material, which is disposed immediately below the casing 3, and is suspended from the casing by means of the bearing brackets 8 and 9. Each bearing bracket is constructed from a single length of steel plate, bent upon itself to provide a cylindrical bearing 10 for the member 7. The opposite sides of the plate, beyond the bearing 10, are securely fastened together by the bolts 11. Beyond the fastening means or bolts 11, the opposite sides of the plate are bent or curved to form semi-cylindrical parts 12 for the reception of the casing 3, and the extremities of the plate are brought close together and secured by the bolts 13. By this construction of bracket, the member 7 is suspended securely and firmly from the casing 3, in order to resist various backward and forward and lateral strains. The central portion of the rod or member 7 is bent or curved or dropped downwardly under the differential casing 4, and this dropped portion 14 has secured to it, in any suitable manner, as shown at 15, a guide bearing 16.

The opposite ends of the member or rod 7 terminate in right-angled downwardly depending legs or parts 17. These legs or parts 17 may be connected to the member or rod 7 in any suitable manner, either by brazing or welding, or made as integral parts. However, each leg or part 17 is preferably cylindrical and is provided with a cylindrical guide chamber 18. Mounted in this chamber is a vertically movable plunger 19, the lower end of which terminates in an enlarged foot 20. This foot is constructed to carry anti- or non-skidding means, either spike devices or vacuum members. In other words, the foot 20 wears a shoe 21, consisting of the upper and lower plates 22 and 23, which are secured together by the screws 24. The upper face of the plate 21 has a depression 25 corresponding in shape to and receiving the lower part of the foot 20. The foot 20 is securely fastened in the depression 25 of the plate 22 by means of the screws 26, which are passed upwardly through the plate and into the foot. The upper face of the plate 23 is likewise provided with a depression 27 for the reception of a metallic plate 28, which is provided with downwardly extending projections or spikes or spurs 29. These spikes or spurs (which are partially conical) extend through a plurality of openings 30 in the plate 23. The spurs or spikes are designed to dig or firmly grip into the ice or snow, whereby the shoe carried by the foot may be held firmly and against slipping at the time of starting or stopping the automobile, hence avoiding skidding. Another plate 31 constructed of any suitable material, preferably rubber, or a composition of rubber and canvas or the like, may be received in the depression 27 of the plate 23. This rubber or composition of rubber and canvas plate is provided with a plurality of cylindrical projections 32 to pass through the openings 30. The projections 32 are provided with conical depressions 33 constituting vacuum cups particularly adapted for engaging slippery, wet or sleety pavements or road-beds, in order to prevent slipping of the foot and to insure against skidding of the automobile.

Carried by the lower ends of the legs or parts 17 are collars 34. Each collar or band 34 may be shrunk, brazed or otherwise secured, for instance, by the rivets or the like 35, to the leg or part 17. Secured in any suitable manner, or formed as an integral part of the collars 34, are braces 36, which extend upwardly and inwardly toward each other, and secured in any suitable manner, for instance by brazing or otherwise, to the bearings 10 of the plates or members or bearing brackets 8, thereby bracing the legs or depending parts 17 against all lateral strains, at the time of starting and stopping the automobile. Connected to the collars or bands 34, integrally or by brazing or otherwise, are braces 37, which extend forwardly, upwardly and inwardly toward each other and are secured at 38 by means of rivets or the like or by brazing or otherwise to the semi-circular or cylindrical parts 39 of one of the hangers or brackets 40, which depend from the drive shaft casing 1. By means of these braces, the legs or depending parts 17 are reinforced against all forward and backward strains.

The depending legs or cylinders 17 in their rear walls are provided with elongated L-shaped slots 41, the vertical parts 42 of which extend longitudinally of the cylinders and act as guides for the lateral pins 43 of the plungers 19. These lateral pins 43 may be secured in any suitable manner to the plungers 19, either integrally or by brazing or otherwise, and are designed to normally engage the lateral parts 44 of the L-shaped slots, in order to hold the plungers 19 normally in raised position against the action of the heavy expansion springs 45. These expansion springs 45 are interposed between the upper ends of the plungers 19 and the upper end walls of the chambers 18. These springs not only act to expand, for throwing the plungers downwardly to cause the non-skidding means to engage the road-bed, but also act as torsional springs, in order to hold the lateral pins 43 in the lateral parts 44 of said L-shaped slots. In order that the springs 45 may act torsionally, the lower end of each is located in a recess 46 of the upper end of each plunger. This recess 46 is arranged eccentric to the center of the plunger, in fact, in the cylindrical circumference, to receive the depending extension 47 of the spring. The upper end of the spring 45 has an extension 48, which extends through the upper end wall of the cylinder or leg or part 17. The opening 49 through which the extension 48 passes is alined axially with the recess 46 of the plunger, and when the spring 45 is inserted in place, it is put under tension or given a partial twist, so that the torsional action of the spring will exert itself to hold the lateral pin 43 in the lateral part 44 of the L-shaped slot, thereby holding the plunger normally in its raised position.

A nut 50 is threaded on the extension 48, and the extremity of the extension 48 is riveted, as shown at 51, thereby preventing displacement of the nut 50. The expansive action of the spring 45 is sufficient and great enough to force the plunger 19 quickly downwardly, whereby the spikes or the vacuum cups may engage the road-bed positively. Carried by or secured to the lateral pins 43 in any suitable manner, for instance, by brazing or otherwise, are eyes 52, and carried by the rear faces of the legs or cylinders 17 are eyes 53. The hangers or bearing brackets 40 are each constructed from a metal strap, bent to form the cylindrical bearing 54, and beyond the bearing 54 the end parts of the strap are riveted or otherwise secured together, as shown at 55, whereby the semi-cylindrical portions 39 may clamp the drive shaft casing 1 in diametrically opposed positions. Mounted in the cylindrical bearings 54 in an operating rod 56, the rear end portion of which is movable in the bearing 16, and the rear extremity of the operating rod has an eye 57. Connected in the eye 57, as at 58, are the cables or cords 59, which pass through the eyes 53 and have their outer ends secured to the eyes 52 of the lateral pins 43. This operating rod 56 consists of two sections 60 and 61, which are telescopically united, as shown clearly in Figs. 2 and 11, and the section 61 is designed to be held in different adjusted positions in the section 60 by means of the thumb screw 62. This operating rod is constructed in adjustable telescopical sections, in order to fit automobile frames or chassis of different lengths. Secured to the foot-board or portion 63 of the floor of the automobile by means of the bolts or the like 64, is a bearing plate 65 provided with an elongated slot 66. Pivotally mounted upon a pin 67 (which is carried by the ears 68 of the bearing plate) is a lever 69. This lever is angular, as shown in Figs. 1, 2 and 11, and is provided with a transverse foot-engaging portion 70 at its upper end and opposing forks 71 at its lower end. The forks 71 are provided with slots 72 for the reception of a pivot bolt 73, by which the forward end of the section 61 of the operating rod 56 is pivotally connected between the forks 71. It is to be observed that the operating rod 56 is suspended immediately below the drive shaft casing 1 and, owing to this, the lever 69 is provided with a lateral bend or arch 74. The arch 74 is large and elongated enough to arch laterally about the casing 1 and at the same time leave clearance enough to permit of the actuation of the lever 69. The slot 66 in the bearing plate is elongated enough to allow of movement of the lever when depressed by the foot of the operator. It is to be observed that the lateral portions 43 of said L-shaped slots of the cylinders or legs 17 extend laterally from each other, and by the torsional action of both springs 45 the lateral pins 43 of the plungers 19 are held in engagement with the shoulders 75 of the lateral parts 44 of the L-shaped slots. It is to be noted that when the plungers 19 and their non-skidding spikes or vacuum cups are in raised positions, the operating rods 56 assume positions, shown in Figs. 2 and 11, the cords or cables 59 being under tension slightly, as shown, and it is to be further observed that by means of the spring 76 the foot lever 69 is held in the position shown in Figs. 2 and 11. This spring 76 is connected to the lever 69, and, in turn, to a part of the frame of the automobile. However, the tension of this spring 76 is not sufficient to overcome the torsional actions of the springs 45, but just sufficient to hold the foot lever 69 in a position against idle movement. When it is desired to drop the plungers or cause them to be dropped, manual pressure by means of the foot is applied to the transverse part 70 of the foot lever 69, and, since the slot 66 is long enough to permit of a partial actuation of the lever 69, a longitudinal movement is imparted to the operating rod 56. The operating rod 56 will, in turn, immediately impart pulling actions simultaneously on the cords or cables 59, which will instantly rock the plungers 19 on parallel axes in such a manner and slowly against the torsional actions of the springs 45, whereby the pins 43 may oscillate toward each other sufficiently to disengage them from the shoulders 75 of the lateral parts 44 of the L-shaped slots of the cylinders or legs. Just as soon as the lateral pins 43 become registered with the vertical portions 42 of the L-shaped slots, the expansive action of the springs 45 instantly come into play, thereby imparting downward movements to the plungers 19. It is to be observed that owing to the torsional action of the springs 45, the shoes and their non-skidding means of the feet of the plungers 19 are held substantially at right angles to the tread surface of the tires of the drive wheels of the automobile. But, when the plungers are given a partial turn or rocking movement against the torsional actions of the springs 45, the shoes of the feet of said plungers will assume acute angles to the tread surface of the drive wheels of the automobile, thereby attaining a greater holding effect on the road-bed and more efficiently relieving or avoiding non-skidding. After the plungers 19 have descended and the functions of the non-skidding means performed, said plungers during such actions impart pulling actions on the cords or cables 59, which, in turn, will move the operating rod 56 forward, and will then tilt the foot lever 69 rearwardly. After the non-skidding means has performed its duty, it is the aim to restore the plungers to their initial positions. In order to accomplish this, foot pressure is applied to the lever 69, which, in turn, will impart rearward reciprocating movement to the operating rod 56, pulling upon the cords or cables 59 and, consequently, raising the plungers and their non-skidding means. The plungers are elevated in the chambers 18 of the legs 17 until the pins 43 reach the upper ends of the vertical slots, and then the plungers are allowed to slowly, but partially, descend by the expansive action of the springs, and just as soon as the pins 43 register with the lateral parts 44 of the L-shaped slots 41, the torsional actions of the springs 45 will rock or partially rotate the plungers 19, whereby the pins 43 will move into the lateral parts 44 of said L-shaped slots. The shoulders 75 will act to support the plungers in their raised positions.

In Figs. 11, 12 and 13, the combined torsional and expansive springs 45 are dispensed with, and in lieu thereof simply expansive springs 76ª are employed, the expansive actions of which act to force the plungers 19 downward, to cause the non-skidding means to act upon the road-bed. However, in using only expansive springs, it is necessary to provide some means for releasing the plungers 19, and to accomplish this additional cords or cables 77 are provided. These cords or cables are attached to eyes 78 of the lateral pins 43, and are passed through the eyes 79 depending from the bearings 10 of the brackets 9. These cords 77 merge together, as at 80, to which a single cord 81 is connected. The cord 81 is in turn, connected at 82, to a foot lever 83, which is pivoted at 84 between the sides 85 of a supporting plate 86 which is designed to be fastened to the foot-board of the floor of an automobile. A spring 87 is connected to the foot lever, and, in turn, to a part of the frame of the automobile, holding the lever 83 normally in the position shown in Fig 11. In order to release or disengage the lateral pins 43 from the shoulders 75 of the lateral parts 44 of the L-shaped slots, foot pressure is applied to the lever 83, imparting a slight pulling action upon the cord or cable 81. This pulling action, in turn, pulls upon the cords 77, which will simultaneously disengage the lateral pins 43 from the shoulders 75. The expansive action of the springs 76 will instantly force the plungers 19 downwardly, thereby applying the non-skidding means. To restore the plungers 19 of the form of structure in Fig. 11 to their normal positions, foot pressure may be applied to both levers 69 and 83, and this foot pressure is maintained on both levers until the pins 43 register with the lateral parts 44 of the L-shaped slots, after which pressure is released on the foot lever 83, and foot pressure is increased on the lever 69, action upon the operating rod 56 will impart pulling action upon the cables or cords 59, and restore the lateral pins 43 in engagement with the shoulders 75 of the lateral parts 44 of the L-shaped slots. These actions may be repeated when it is desired to again apply the non-skidding means.

In Fig. 8 another form of operating means is provided for actuating the operating rod 56. This means comprises a casing 88 which may be of any suitable shape, preferably as shown, and is designed to be secured at 89 to the foot-board 63 of the floor of the automobile. This casing 88 has an enlarged part 90, in the opposite walls of which cylindrical extensions 91 of a shaft 92 are mounted. The central portion of the shaft is rectangular in cross section and carries a gear 93. Formed integral with the gear, as at 94, is a radial arm 95, the free end of which has a slot 96. A push rack bar 97 is mounted in the guide portion 98 of the casing 88 and its teeth mesh with the gear 93. The reduced portion 99 of the rack bar is guided in the opening 100 of the lower end of the casing 88. The upper end of the rack bar has a foot piece 101. In applying the operating means in Fig. 8, the extremity of the section 61 of the operating rod 56 is pivotally connected in the slot 96 of the arm 95 by means of the stud pin 102. It is to be noted that by applying foot pressure upon the foot piece 101, depressing the rack bar 97, a rotating action may be imparted to the gear, which will, in turn, through the medium of the arm 95, move the operating rod 56 rearwardly, and, consequently, raise the plungers 19.

The invention having been set forth, what is claimed as new and useful is:—

1. The combination with an automobile rear drive axle casing, of carriers suspended therefrom, non-skidding devices movably and yieldably mounted in said carriers, and holding means formed in and carried by the carriers to hold the devices in normal raised positions.

2. The combination with an automobile rear drive axle casing, of carriers suspended therefrom, non-skidding devices in said carriers, holding means carried by the carriers to hold the devices in normal raised positions, and means for holding said devices in engagement with said holding means.

3. The combination with the rear drive axle casing, of carriers suspended therefrom, non-skidding devices in said carriers, holding means carried by the carriers to hold the devices in normal raised positions, and torsional means for holding said devices in engagement with said holding means.

4. In combination with the rear drive axle casing, vertical carriers suspended therefrom, non-skidding shoes having stems mounted in said carriers, holding means for holding the stems whereby the non-skidding shoes are held at right angles to the drive wheels, torsional means for holding the stems yieldably in such positions, and means for actuating the stems against the action of the torsional means for throwing the shoes at acute angles to the tread surface of the drive wheels.

5. In combination with the rear drive axle casing, vertical carriers suspended therefrom, non-skidding shoes having stems mounted in said carriers, holding means for holding the stems whereby the non-skidding shoes are held at right angles to the drive wheels, torsional means for holding the stems yieldably in such positions, means for actuating the stems against the action of the torsional means for throwing the shoes at acute angles to the tread surface of the drive wheels, and means for imparting downward movements to the stems as the shoes assume acute angles to the wheel treads.

6. In combination with the rear drive axle casing, movable non-skidding devices suspended therefrom, tensioning means therefor to hold the devices out of engagement with the road-bed, means for holding the devices at right angles to the tread surface of the drive wheel, and means for actuating the devices against the action of the second means, whereby the first means may respond to throw the non-skidding devices downwardly and at acute angles to the tread surfaces of the drive wheels.

7. In combination with a rear drive axle casing, a carrier suspended thereon having guide chambers at each end, the walls of the guide chambers having L-slots, non-skidding means having stems mounted in the chambers and provided with lateral devices engaging the lateral portions of the L-slots, means for holding the lateral devices in engagement with the lateral portions of the L-slots, means for imparting downward movement to the stems to apply the non-skidding means, and means to impart a torsional action to the stems to release the lateral devices, whereby the tensioning means may respond to apply the non-skidding means.

8. In combination with a rear drive axle casing, a carrier suspended thereon having guide chambers at each end, the walls of the guide chambers having L-slots, non-skidding means having stems mounted in the chambers and provided with lateral devices engaging the lateral portions of the L-slots, torsional means for holding the lateral devices in engagement with the lateral portions of the L-slots, said torsional means including expansible means for imparting downward movement to the stems to apply the non-skidding means, and means to actuate the stems against the torsional means to release the lateral devices from the lateral portions of the L-slots, whereby the tensioning means may respond to apply the non-skidding means.

9. In combination with a rear axle drive casing, a carrier suspended thereon, the opposite ends of the carrier having depending legs provided with guide chambers, the walls of the legs having L-slots, non-skidding shoes having stems vertically movable in the chambers, said stems having lateral pins engaging the lateral parts of the L-slots, combined torsional and expansive means acting at one time to hold the lateral pins in the lateral parts of the L-slots torsionally, and at certain other times to impart downward movements to the stems to apply the non-skidding shoes.

10. In combination with a rear axle drive casing, a carrier suspended thereon, the opposite ends of the carrier having depending legs provided with guide chambers, the walls of the legs having L-slots, non-skidding shoes having stems vertically movable in the chambers, said stems having lateral pins engaging the lateral parts of the L-slots, combined torsional and expansive means acting at one time to hold the lateral pins in the lateral parts of the L-slots torsionally, and at certain other times to impart downward movements to the stems to apply the non-skidding shoes, and means connected to the lateral pins for imparting a rocking movement to the stems against the action of the combined expansive and torsional means, whereby the expansive action may actuate the stems to apply the non-skidding shoes.

11. In a device as set forth, a vertically movable element having a foot, a shoe, said shoe comprising upper and lower members, the upper member having a depression to receive the foot, the lower member having a depression, the bottom wall of which has openings, a carrier supported in the depression of the lower member and having non-skidding means projecting through said openings, means for securing the upper member to the foot, and means for securing both members together to clamp the carrier.

12. In a non-skidding device for automobiles, a hanger fixedly suspended from the rear axle of the automobile, tubular carriers depending from the ends of the hanger and having vertical guide slots provided with lateral parts, plungers mounted in said carriers for vertical movement therein, non-skidding shoes carried by the lower ends of said plungers, means on the plungers engaging said lateral parts to support the plungers raised, means in the carriers and operating the plungers to force said means in said lateral parts and also force said plungers downwardly, whereby said shoes may engage the roadbed at acute angles to the wheel treads, and a mechanism for disengaging said first means from said lateral parts.

13. In a non-skidding device for automobiles, the combination with a hanger rigidly fixed and suspended from the rear axle of the automobile, of bracing means therefor, tubular carriers depending from the ends of the hanger and having vertical guide slots provided with lateral parts, plungers mounted in said carriers for vertical movement therein, non-skidding shoes carried by the lower ends of said plungers, spring means forcing said plungers downwardly to cause said shoes to engage the roadbed, elements carried by the plungers and engaging said lateral parts to hold said plungers raised, means connected to said elements to raise the plungers, whereby said elements may engage said lateral parts, and means to actuate said plungers to force said elements in engagement with said lateral parts.

14. In an automobile non-skidding device the combination with a holder, of a plunger movable therein and having a foot, a shoe comprising a pair of complemental upper and lower plates, the upper plate having a recess to receive said foot, means to secure said upper plate to said foot, the lower plate having a recess in its upper face and provided with openings therein, a non-skidding element between said plates and engaging said recess of the lower plate and having engaging devices protruding through said openings, and means for fastening the plates together.

In witness whereof, in the presence of two witnesses, the inventor's signature is hereunto affixed.

JOHN QUEEN SLYE.

Witnesses:
JAS. N. FITZPATRICK, Jr.
A. W. HOWARD.